US011484965B2

(12) United States Patent
Kadoya et al.

(10) Patent No.: US 11,484,965 B2
(45) Date of Patent: Nov. 1, 2022

(54) METHOD FOR MANUFACTURING JOINED MEMBER AND APPARATUS FOR MANUFACTURING THE SAME

(71) Applicant: ORIGIN ELECTRIC COMPANY, LIMITED, Saitama (JP)

(72) Inventors: Yasuo Kadoya, Saitama (JP); Yuki Oshino, Saitama (JP)

(73) Assignee: ORIGIN COMPANY, LIMITED, Saitama (JP)

( * ) Notice: Subject to any disclaimer, the term of this patent is extended or adjusted under 35 U.S.C. 154(b) by 450 days.

(21) Appl. No.: 16/675,055

(22) Filed: Nov. 5, 2019

(65) Prior Publication Data
US 2020/0108461 A1 Apr. 9, 2020

Related U.S. Application Data

(62) Division of application No. 15/578,657, filed as application No. PCT/JP2016/066485 on Jun. 2, 2016, now abandoned.

(30) Foreign Application Priority Data

Jun. 8, 2015 (JP) ................................ 2015-115808

(51) Int. Cl.
*B23K 11/16* (2006.01)
*B23K 11/02* (2006.01)
(Continued)

(52) U.S. Cl.
CPC .............. *B23K 11/16* (2013.01); *B23K 11/02* (2013.01); *B23K 11/241* (2013.01); *B23K 11/36* (2013.01);
(Continued)

(58) Field of Classification Search
CPC ........ B23K 31/00; B23K 11/02; B23K 11/16; B23K 11/241; B23K 11/36;
(Continued)

(56) References Cited

U.S. PATENT DOCUMENTS 2,827,546 A * 3/1958 Fruengel .............. B23K 11/008
219/56
3,558,915 A * 1/1971 Wood ..................... H03K 17/73
327/256
(Continued)

FOREIGN PATENT DOCUMENTS

IN 483DEN2015 A 2/2014
JP S56-123328 A 9/1981
(Continued)

OTHER PUBLICATIONS

First Examination Report dated Dec. 6, 2019 issued for Indian Patent Application No. 201847000095, with English translation—5 pages.
(Continued)

*Primary Examiner* — Eric S Stapleton
(74) *Attorney, Agent, or Firm* — Squire Patton Boggs (US) LLP

(57) ABSTRACT

To provide a method and apparatus for manufacturing a joined member that inhibit occurrence of cracks in a joined member even when the joined portion is quenched when members are welded together. The method includes placing the first member D and the second member E with a joint target portion Df and a joint target portion Ef being in contact with each other, welding the joint target portions by heating, subjecting the first member D after the welding to a process for inhibiting occurrence of cracks, and tempering a portion where the first and second members have been welded to each other by electromagnetic heating. The apparatus includes a first electrode 11 to contact with the first
(Continued)

member D; a second electrode 12 to contact with the second member E; and an induction heating coil 23 for performing induction heating of a portion where a joint target portions Df and Ef have been contacted and joined to each other, and the induction heating coil 23 is placed between the two electrodes 11 and 12 when the induction heating is performed.

5 Claims, 5 Drawing Sheets

(51) Int. Cl.
　　*B23K 11/24*　　(2006.01)
　　*B23K 11/36*　　(2006.01)
　　*B23K 31/00*　　(2006.01)
　　*C21D 1/42*　　(2006.01)
　　*C21D 9/50*　　(2006.01)
　　*B23K 103/04*　　(2006.01)
　　*B23K 103/06*　　(2006.01)

(52) U.S. Cl.
　　CPC .............. *B23K 31/00* (2013.01); *C21D 1/42* (2013.01); *C21D 9/50* (2013.01); *B23K 2103/04* (2018.08); *B23K 2103/06* (2018.08); *Y02P 10/25* (2015.11)

(58) Field of Classification Search
　　CPC .. B23K 2103/06; B23K 2103/04; C21D 1/42; C21D 9/50; Y02P 10/25; Y02P 10/253
　　USPC ....................................................... 219/117.1
　　See application file for complete search history.

(56) References Cited

U.S. PATENT DOCUMENTS

| | | | | | |
|---|---|---|---|---|---|
| 4,419,557 | A | * | 12/1983 | Gellatly | B23K 11/163 219/86.25 |
| 4,496,821 | A | * | 1/1985 | Burgher | H01F 27/2866 219/116 |
| 4,669,650 | A | * | 6/1987 | Moe | B23K 20/14 228/42 |
| 4,736,084 | A | * | 4/1988 | Moe | B23K 13/043 219/105 |
| 4,844,752 | A | * | 7/1989 | Bear | C21D 1/10 148/571 |
| 5,253,696 | A | * | 10/1993 | Misra | B22D 27/02 164/250.1 |
| 5,533,370 | A | * | 7/1996 | Kuroda | B21B 17/14 72/235 |
| 5,571,437 | A | * | 11/1996 | Rudd | H05B 6/42 219/617 |
| 5,624,594 | A | * | 4/1997 | Matsen | B29C 35/08 219/645 |
| 5,641,422 | A | * | 6/1997 | Matsen | B29C 70/44 219/634 |
| 5,723,849 | A | * | 3/1998 | Matsen | B29C 66/72141 219/645 |
| 5,847,375 | A | * | 12/1998 | Matsen | B29C 70/542 156/64 |
| 5,909,232 | A | * | 6/1999 | Goto | G06K 15/129 347/187 |
| 6,023,283 | A | * | 2/2000 | Imai | B41J 2/36 347/212 |
| 6,083,329 | A | * | 7/2000 | Tsuchiya | B23K 20/028 148/567 |
| 6,290,789 | B1 | * | 9/2001 | Toyooka | C21D 8/10 148/648 |
| 6,515,250 | B2 | * | 2/2003 | Miyasaka | B23K 11/02 228/193 |
| 6,613,999 | B2 | * | 9/2003 | Katayama | B23K 11/115 219/77 |
| 6,756,558 | B2 | * | 6/2004 | Salzer | B23K 11/241 219/112 |
| 7,126,096 | B1 | * | 10/2006 | Matsen | B29C 65/34 219/645 |
| 7,181,821 | B2 | * | 2/2007 | Anderson | B23K 20/023 29/523 |
| 8,723,083 | B2 | * | 5/2014 | Kawata | H05B 6/062 219/209 |
| 9,131,539 | B2 | * | 9/2015 | Fujinami | H05B 6/062 |
| 9,676,052 | B2 | * | 6/2017 | Goto | B23K 11/315 |
| 2002/0182438 | A1 | * | 12/2002 | Wakita | B21K 1/063 428/683 |
| 2003/0221753 | A1 | * | 12/2003 | Toyooka | C21D 8/10 148/320 |
| 2003/0222056 | A1 | * | 12/2003 | Salzer | B23K 11/241 219/116 |
| 2005/0092715 | A1 | * | 5/2005 | Alford | B23K 11/02 219/61.2 |
| 2005/0135828 | A1 | * | 6/2005 | Joichi | G03G 15/80 399/75 |
| 2005/0199486 | A1 | * | 9/2005 | Doan | C23C 26/02 204/298.41 |
| 2008/0173632 | A1 | * | 7/2008 | Jang | H05B 3/746 219/447.1 |
| 2008/0226491 | A1 | * | 9/2008 | Satou | B23K 11/0873 219/78.01 |
| 2008/0237215 | A1 | * | 10/2008 | Lee | F24C 15/105 219/448.12 |
| 2009/0212024 | A1 | * | 8/2009 | Muller | B23K 37/0531 219/61 |
| 2010/0258535 | A1 | * | 10/2010 | Fukutani | B23K 13/025 138/171 |
| 2010/0264131 | A1 | * | 10/2010 | Moe | B23K 13/01 219/635 |
| 2011/0203937 | A1 | * | 8/2011 | Sidhu | B33Y 10/00 205/133 |
| 2011/0272386 | A1 | * | 11/2011 | Morrisroe | B23K 10/00 219/121.52 |
| 2012/0319092 | A1 | * | 12/2012 | Shimomura | H01L 33/56 428/188 |
| 2013/0037530 | A1 | * | 2/2013 | Bollegue | C21D 1/42 219/158 |
| 2014/0272448 | A1 | * | 9/2014 | Valdez | C21D 9/50 428/592 |
| 2014/0339210 | A1 | * | 11/2014 | Kobayashi | H05B 1/023 219/162 |
| 2015/0173125 | A1 | * | 6/2015 | Ooyama | H05B 3/0095 219/162 |
| 2015/0321417 | A1 | * | 11/2015 | Mironets | B23P 15/00 156/263 |

FOREIGN PATENT DOCUMENTS

| | | |
|---|---|---|
| JP | H11-197853 A | 7/1999 |
| JP | 2004-017048 A | 1/2004 |
| JP | 2009-125801 A | 6/2009 |
| JP | 2012-223815 A | 11/2012 |
| JP | 2014-084504 A | 5/2014 |
| WO | WO 2012/147439 A1 | 11/2012 |

OTHER PUBLICATIONS

International Search Report for PCT Application No. PCT/JP2016/066485, dated Aug. 9, 2016, English translation—2 pages.

* cited by examiner

METHOD FOR MANUFACTURING JOINED MEMBER AND APPARATUS FOR MANUFACTURING THE SAME

CROSS-REFERENCE TO RELATED APPLICATIONS

This application is a divisional of U.S. application Ser. No. 15/578,657, entitled "METHOD FOR MANUFACTURING JOINED MEMBER AND APPARATUS FOR MANUFACTURING THE SAME," filed on Nov. 30, 2017, which is a National Stage filing under 35 U.S.C. § 371 of International Patent Application No. PCT/JP2016/066485, filed Jun. 2, 2016 and entitled "METHOD FOR MANUFACTURING JOINING MEMBER, AND DEVICE FOR MANUFACTURING JOINING MEMBER," which claims the benefit of priority to JP Application No. 2015-115808, filed Jun. 8, 2015, all of these applications which are herein incorporated by reference in their entirety for all purposes.

TECHNICAL FIELD

The present invention relates to a method for manufacturing a joined member and a joined member manufacturing apparatus, more particularly, to a method for manufacturing a joined member and a joined member manufacturing apparatus in which occurrence of cracks in a welded portion of the joined member is inhibited.

BACKGROUND ART

When two members are welded to each other, mash seam welding where a pair of roller electrodes is moved along overlap margins of portions to be welded under application of pressure and electric current can be employed. One problem of mash seam welding is its prolonged welding time. As a welding method that solves the problem of mash seam welding, there is a method in which portions of two objects to be welded are slightly overlapped and a welding electric current is applied with a pressure being applied between the portions to be welded (refer to Patent Document 1, for example).

PRIOR ART DOCUMENT

Patent Document

Patent Document 1: JP 2004-17048 A

SUMMARY OF THE INVENTION

Problem to be Solved by the Invention

In a welding technique by heating, when objects to be welded are made of high-carbon steel such as quenched carburized steel, the welded portions of the objects may be changed to a hard and brittle quenched structure and suffer from cracks.

The present invention has been made in view of the above problem, and it is, therefore, an object of the present invention to provide a method and apparatus for manufacturing a joined member that inhibit occurrence of cracks in the manufactured joined member even when the joined portion is quenched when two members are welded together.

Means for Solving the Problem

To achieve the above object, a method for manufacturing a joined member according to the first aspect of the present invention is, as shown in FIGS. 3A, 3C and 3D, for example, a method for manufacturing a joined member C (see FIG. 2C, for example) by joining a first member D formed of a metal material having a possibility of undergoing quenching and a second member E formed of a metal material, and the method includes a contact-placing step of placing the first member D and the second member E with a joint target portion Df of the first member D and a joint target portion Ef of the second member E being in contact with each other (see FIG. 3A); a welding step of welding the joint target portions of the first member D and the second member E by heating (see FIG. 3C); a crack-inhibition step of subjecting the first member D after the welding step to a process for inhibiting occurrence of cracks; an electromagnetic heating step of tempering a portion where the first member D and the second member E have been welded to each other by electromagnetic heating (see FIG. 3D); wherein the welding step is a step of performing resistance welding of the joint target portions of the first member D and the second member E with simultaneous application of pressure; and wherein the crack-inhibition step includes heating the portion where the first member D and the second member E have been welded to each other, by passing an electric current therethrough in order to achieve preliminary tempering.

With this configuration, because the welding and electromagnetic heating can be performed at different locations, the degree of freedom of steps can be increased.

As for the method for manufacturing a joined member according to the second aspect of the present invention, as shown in FIGS. 3D, 4A and 4B, for example, in the method for manufacturing a joined member according to the first aspect, electromagnetic heating step (see FIG. 3D) is achieved by induction heating using an induction heating coil 23, and the electromagnetic heating step includes: placing the induction heating coil 23 in a vicinity of a first edge Sn forming an outer circumference of a joint surface between the first member D and the second member E; and tempering the joint surface Jf on a side of an opposite edge Sf opposed to the first edge Sn first and then tempering the joint surface Jn on a side of the first edge Sn with an output from the induction heating coil 23 reduced to a level lower than that used to temper the joint surface Jf on the side of the opposite edge Sf.

With this configuration, the entire joint surface can be tempered with a single installation of an induction heating coil.

As for the method for manufacturing a joined member according to the third aspect of the present invention, as shown in FIG. 5, for example, in the method for manufacturing a joined member according to the first aspect, the electromagnetic heating step is achieved by induction heating using induction heating coils 23 and 23A, and the electromagnetic heating step includes: placing one 23 of the induction heating coils in a vicinity of a first edge Sn forming an outer circumference of the joint surface between the first member D and the second member E and the other 23A in a vicinity of an opposite edge Sf opposed to the first edge Sn of the joint surface, and tempering the joint surface Jn on the side of the first edge Sn with the induction heating coil 23 placed in the vicinity of the first edge Sn and tempering the joint surface Jf on the side of the opposite edge Sf with the induction heating coil 23A placed in the vicinity of the opposite edge Sf.

With this configuration, because the first edge side and the opposite edge side of the joint surface can be tempered simultaneously, the time required for the electromagnetic heating step can be shortened.

To achieve the above object, a method for manufacturing a joined member according to the fourth aspect of the present invention is, as shown in FIGS. 3A, 3C, 3D, 4A and 4B, for example, a method for manufacturing a joined member C (see FIG. 2C, for example) by joining a first member D formed of a metal material having a possibility of undergoing quenching and a second member E formed of a metal material, and the method includes a contact-placing step of placing the first member D and the second member E with a joint target portion Df of the first member D and a joint target portion Ef of the second member E being in contact with each other (see FIG. 3A); a welding step of welding the joint target portions of the first member D and the second member E by heating (see FIG. 3C); a crack-inhibition step of subjecting the first member D after the welding step to a process for inhibiting occurrence of cracks; and an electromagnetic heating step of tempering a portion where the first member D and the second member E have been welded to each other by electromagnetic heating (see FIG. 3D); wherein the electromagnetic heating step is achieved by induction heating using an induction heating coil 23, and the electromagnetic heating step includes: placing the induction heating coil 23 in a vicinity of a first edge Sn forming an outer circumference of a joint surface between the first member D and the second member E; and tempering the joint surface Jf on a side of an opposite edge Sf opposed to the first edge Sn first and then tempering the joint surface Jn on the side of the first edge Sn with an output from the induction heating coil 23 reduced to a level lower than that used to temper the joint surface Jf on the side of the opposite edge Sf.

With this configuration, the entire joint surface can be tempered with a single installation of an induction heating coil.

To achieve the above object, a method for manufacturing a joined member according to the fifth aspect of the present invention is, as shown in FIGS. 3A, 3C, 3D and 5, for example, a method for manufacturing a joined member C (see FIG. 2C, for example) by joining a first member D formed of a metal material having a possibility of undergoing quenching and a second member E formed of a metal material, and the method includes a contact-placing step of placing the first member D and the second member E with a joint target portion Df of the first member D and a joint target portion Ef of the second member E being in contact with each other (see FIG. 3A); a welding step of welding the joint target portions of the first member D and the second member E by heating (see FIG. 3C); a crack-inhibition step of subjecting the first member D after the welding step to a process for inhibiting occurrence of cracks; and an electromagnetic heating step of tempering a portion where the first member D and the second member E have been welded to each other by electromagnetic heating (see FIG. 3D); wherein the electromagnetic heating step is achieved by induction heating using induction heating coils 23 and 23A, and the electromagnetic heating step includes: placing one 23 of the induction heating coils in a vicinity of a first edge Sn forming an outer circumference of the joint surface between the first member D and the second member E and the other 23A in a vicinity of an opposite edge Sf opposed to the first edge Sn of the joint surface, and tempering the joint surface Jn on the side of the first edge Sn with the induction heating coil 23 placed in the vicinity of the first edge Sn and tempering the joint surface Jf on the side of the opposite edge Sf with the induction heating coil 23A placed in the vicinity of the opposite edge Sf.

With this configuration, because the first edge side and the opposite edge side of the joint surface can be tempered simultaneously, the time required for the electromagnetic heating step can be shortened.

As for the method for manufacturing a joined member according to the sixth aspect of the present invention, as shown in FIGS. 3A to 3E, for example, in the method for manufacturing a joined member according to the fourth or fifth aspect, the welding step is a step of performing resistance welding of the joint target portions of the first member D and the second member E with simultaneous application of pressure; and the crack-inhibition step includes maintaining the application of pressure in the welding step.

With this configuration, because the welding and electromagnetic heating can be performed sequentially, productivity can be improved.

To achieve the above object, a joined member manufacturing apparatus according to the seventh aspect of the present invention is, as shown in FIG. 1, for example, an apparatus for manufacturing a joined member C (see FIG. 2C, for example) by joining a first member D formed of a metal material having a possibility of undergoing quenching and a second member E formed of a metal material, and the joined member manufacturing apparatus includes a first electrode 11 to be brought into contact with the first member D; a second electrode 12 to be brought into contact with the second member E; an induction heating coil 23 for performing induction heating of a portion where a joint target portion Df (see FIG. 2B, for example) of the first member D in contact with the first electrode 11 and a joint target portion Ef (see FIG. 2B, for example) of the second member E in contact with the second electrode 12 have been contacted and joined to each other; and a controller 50 for controlling supply of electric current to the first electrode 11 and the second electrode 12 and supply of electric current to the induction heating coil 23; wherein the induction heating coil 23 is configured to be placed between the first electrode 11 and the second electrode 12 when the induction heating of a portion where the first member D and the second member E have been joined to each other is performed; and wherein the controller 50 is configured to pass an electric current between the first electrode 11 brought in contact with the first member D and the second electrode 12 brought in contact with the second member E, with simultaneous application of pressure to the joint target portion Df (see FIG. 2B, for example) of the first member D and the joint target portion Ef (see FIG. 2B, for example) of the second member E, the joint target portions being in contact with each other, to weld the joint target portions, to temper a joint surface Jf (see FIG. 4A, for example) on a side of an opposite edge Sf (see FIG. 4A, for example) opposed to a first edge Sn (see FIG. 4A, for example) forming an outer circumference of the joint surface between the first member D and the second member E, with the induction heating coil 23 being placed in a vicinity of the first edge Sn, while maintaining the application of pressure to the joint surface, and then to temper the joint surface Jn (see FIG. 4A, for example) on a side of the first edge Sn with an output from the induction heating coil 23 reduced to a level lower than that used to temper the joint surface Jf on the side of the opposite edge Sf.

As for the joined member manufacturing apparatus according to the eighth aspect of the present invention, as shown in FIGS. 1 and 5, for example, in the joined member manufacturing apparatus according to the seventh aspect, the controller 50 is configured to temper the joint surface Jn on the side of the first edge Sn forming an outer circumference of the joint surface, with an induction heating coil 23 placed in a vicinity of the first edge Sn, and to temper the joint surface Jf on the side of the opposite edge Sf opposed to the first edge Sn, with an induction heating coil 23A placed in a vicinity of the opposite edge Sf, instead of being configured to temper the joint surface Jf on the side of an opposite edge Sf opposed to the first edge Sn forming an outer circumference of the joint surface, with the induction heating coil 23 being placed in the vicinity of the first edge Sn, and then to temper the joint surface Jn on the side of the first edge Sn with an output from the induction heating coil 23 reduced to a level lower than that used to temper the joint surface Jf on the side of the opposite edge Sf.

To achieve the above object, a joined member manufacturing apparatus according to the ninth aspect of the present invention is, as shown in FIGS. 1 and 5, for example, an apparatus for manufacturing a joined member C (see FIG. 2C, for example) by joining a first member D made of a metal material having a possibility of undergoing quenching and formed to have a ring-like shape and a second member E made of a metal material and formed to have a circular cylindrical shape, and the joined member manufacturing apparatus includes a first electrode 11 to be brought into contact with the first member D; a second electrode 12 to be brought into contact with the second member E; and an induction heating coils 23 and 23A for performing induction heating of a portion where a joint target portion Df (see FIG. 2B, for example) of the first member D in contact with the first electrode 11 and a joint target portion Ef (see FIG. 2B, for example) of the second member E in contact with the second electrode 12 are contacted and joined to each other; wherein the induction heating coils include a first induction heating coil 23 wound into a circle with a diameter slightly larger than an outer diameter of the second member E and a second induction heating coil 23A wound into a circle with a diameter smaller than that of the first induction heating coil 23 and placed below the first induction heating coil 23, the first induction heating coil 23 and the second induction heating coil 23A being configured to be placed between the first electrode 11 and the second electrode 12 when induction heating is performed on a portion where the first member D and the second member E are joined to each other.

As for a method for manufacturing a joined member according to the tenth aspect of the present invention is, as shown in FIGS. 1, 3A, 3C and 3D, for example, a method for manufacturing a joined member C (see FIG. 2C, for example) with the joined member manufacturing apparatus 1 according to any one of the seventh aspect to the ninth aspect, and the method includes a member placing step of placing the first member D and the second member E in the joined member manufacturing apparatus 1 (see FIG. 3A); an electrode energizing step of passing an electric current between the first electrode 11 and the second electrode 12 (see FIG. 3C); and a coil energizing step of passing an electric current through the induction heating coil 23 (see FIG. 3D).

With this configuration, even when the joined portion is quenched when the joint target portions are joined using the first electrode and the second electrode, the jointed portion can be tempered by induction heating by the induction heating coil. Thus, occurrence of cracks in the joined portion can be inhibited.

Effect of the Invention

According to the present invention, even when the joined portion is quenched, the jointed portion can be tempered by electromagnetic heating. Thus, occurrence of cracks in the joined portion can be inhibited.

DESCRIPTION OF EMBODIMENTS

Figure 1:
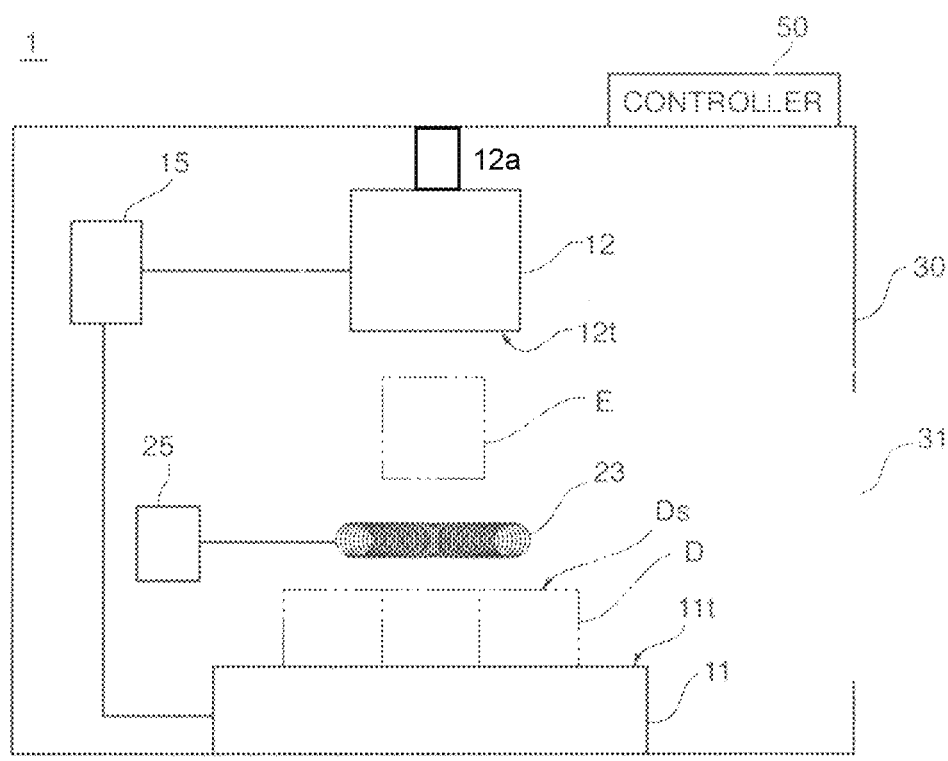
FIG. 1 is a general configuration diagram of a joined member manufacturing apparatus according to an embodiment of the present invention.

This application is based on the Patent Application No. 2015-115808 filed on Jun. 8, 2015 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Description will hereinafter be made of an embodiment of the present invention with reference to the drawings. The same or corresponding members are denoted with the same reference numerals in all the drawings, and their descriptions are not repeated.

Referring first to FIG. 1, a joined member manufacturing apparatus 1 according to an embodiment of the present invention is now described. FIG. 1 is a general configuration diagram of the joined member manufacturing apparatus 1. The joined member manufacturing apparatus 1 includes a first electrode (which is hereinafter referred to as "first electrode 11") to be brought into contact with a first member (which is hereinafter referred to as "first member D"), a second electrode (which is hereinafter referred to as "second electrode 12") to be brought into contact with a second member (which is hereinafter referred to as "second member E"), a welding power source 15, an induction heating coil (which is hereinafter referred to as "heating coil 23"), a coil power source 25, a housing 30 for accommodating the first electrode 11, the second electrode 12, the welding power source 15, the heating coil 23 and the coil power source 25, and a controller 50. Here, prior to detailed description of the joined member manufacturing apparatus 1, the configuration of a joined member manufactured by the joined member manufacturing apparatus 1 is illustrated by way of example.

Figure 2A:
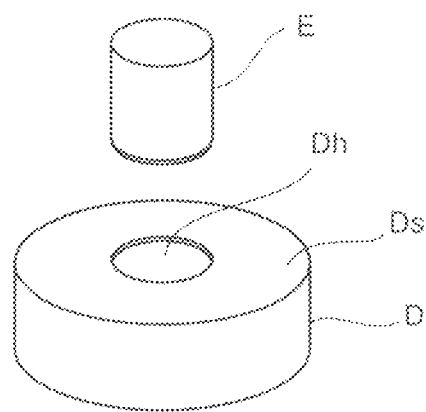
FIG. 2A is a perspective view of a first member and a second member.
Figure 2B:
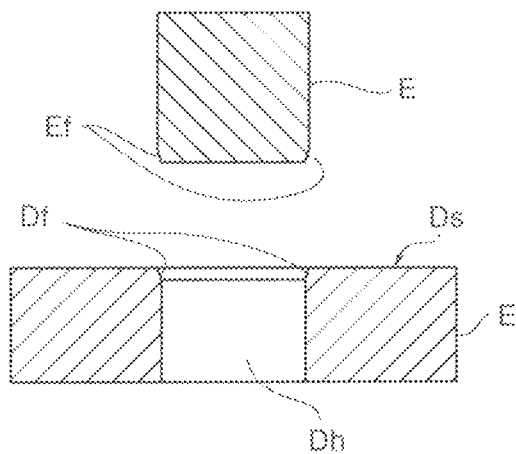
FIG. 2B is a cross-sectional view of the first member and the second member.
Figure 2C:
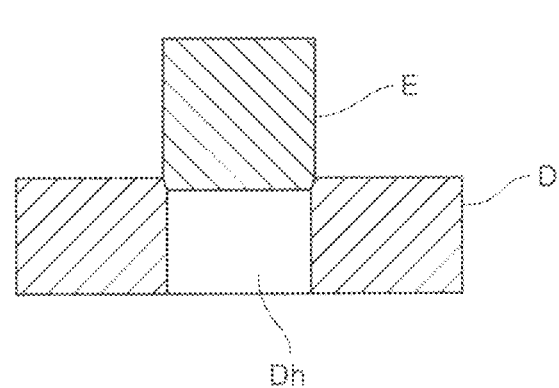
FIG. 2C is a cross-sectional view of a joined member.

FIG. 2A is a perspective view of the first member D and the second member E. FIG. 2B is a cross-sectional view of the first member D and the second member E. FIG. 2C is a cross-sectional view of a joined member C. The joined member C is a component obtained by welding the first member D and the second member E together. In this embodiment, description is made on the assumption that the first member D is formed to have a ring-like shape and the second member E is formed so as to have a circular cylindrical shape. The first member D has a thick disk-like shape with a circular cylindrical hollow portion Dh formed through its center. In the first member D, an outer circumference of the disk and a circumference of the hollow portion Dh are concentric with each other. The first member D has a first joint surface Df formed by chamfering a corner between an end face Ds and the hollow portion Dh. The first joint surface Df corresponds to a joint target portion of the first member D. In this embodiment, the first member D is made of carburized steel obtained by subjecting a ring-shaped low-carbon steel blank to surface carburization. Thus, the first member D is a member having a soft and tough internal structure and hard surfaces having a possibility of undergoing quenching when heated. Here, the expression "having a possibility of undergoing quenching" means that the surfaces contain carbon to such an extent as to be quenched when predetermined conditions are fulfilled. Typically, the surfaces are quenched when heated during welding, but may have been quenched by heating prior to welding (in a carburized steel manufacturing factory, for example). The predetermined conditions are different depending on the specification of the welding machine or the type of material for the first member D, for example.

The second member E is formed with an outer diameter slightly larger than a diameter of the hollow portion Dh of the first member D. The second member E has a second joint surface Ef formed by chamfering a corner between an end face and a lateral face. The second joint surface Ef corresponds to a joint target portion of the second member E. The second joint surface Ef is configured to be in surface contact with the first joint surface Df of the first member D. In this embodiment, the second member E is made of cast iron. In this embodiment, the joined member C is formed by joining the first joint surface Df and the second joint surface Ef by solid phase joining. Solid phase joining is welding that is performed at a temperature equal to or lower than a melting point. In this embodiment, the solid phase joining is achieved by resistance welding. In this embodiment, the ring-shaped first joint surface Df and the second joint surface Ef are joined almost uniformly along their entire circumferences. Examples of characteristics of joining involving such a ring member are as follows: positioning is easy and jigs are simple, the shapes of joint surfaces are simple and processing cost is low, joining can be completed within a short period of time and cycle time is short, and thermal distortion is less likely to occur and dimensional accuracy after joining can be easily achieved. The joined member C can be utilized as a component, such as a gear or shaft, in a large drive system.

Referring again to FIG. 1, description of the joined member manufacturing apparatus 1 is continued. The joined member manufacturing apparatus 1 is configured to be able to perform resistance welding of the first member D and the second member E using the first electrode 11 and the second electrode 12. The first electrode 11 has a first contact face 11*t*, formed on its upper face, with which the first member D is brought into contact. The first contact face 11*t* is typically formed flat. The first electrode 11 is typically placed on a bottom face of the housing 30 such that the first contact face 11*t* is horizontal. The second electrode 12 is placed above the first electrode 11, and has a second contact face 12*t*, formed on its lower face, with which the second member E is brought into contact. The second contact face 12*t* is typically formed flat. The second electrode 12 is supported by an electrode support 12*a* such that the second contact face 12*t* is horizontal. The second electrode 12, supported by the electrode support 12*a*, is configured to be movable vertically and to be able to be pressed against the first electrode 11. The first electrode 11 and the second electrode 12 are electrically connected to the welding power source 15.

The welding power source 15 is a device for supplying the first electrode 11 and the second electrode 12 with an electric current. In this embodiment, the welding power source 15 is connected to an AC power source such as a commercial AC power source or AC power generator, and the welding power source 15 has a power source unit for boosting and rectifying the AC electric power from the AC power source, a capacitor for storing and discharging electrical energy, a welding transformer for converting the electric current supplied from the power source unit and the capacitor into a large electric current, and a switch component disposed upstream of the welding transformer. The welding power source 15 is configured to be able to discharge the energy charged in the capacitor instantaneously. Thus, in welding process using the welding power source 15, a large electric current can be obtained within a short period of time and welding can be achieved with less impact of heat. In addition, in the welding power source 15, an input power source (AC power source) with a relatively small capacity suffices. The welding power source 15 is configured to be able to set the magnitude of the electric current that is supplied to the first electrode 11 and the second electrode 12 as appropriate.

The heating coil 23 is for performing high-frequency induction heating of a portion where the first member D and the second member E have been welded to each other. High-frequency induction heating is a form of electromagnetic heating. The heating coil 23 is wound into a circle with a diameter slightly larger than the outer diameter of the circular cylindrical second member E. The expression "slightly larger" used herein means a size that allows the heating coil 23 to exert the effect of an eddy current that is generated by passing an electric current through the heating coil 23 on a welded portion between the first member D and the second member E without contact with the second member E. The heating coil 23 is supported by a coil support (not shown), and placed between the first electrode 11 and the second electrode 12. The heating coil 23, supported by the coil support (not shown), is configured to be movable (vertically in this embodiment) along an imaginary straight line connecting the first electrode 11 and the second electrode 12. The heating coil 23 is connected to the coil power source 25. The coil power source 25 is a device for generating an electric current passed through the heating coil 23. In this embodiment, the coil power source 25 is connected to an AC power source such as a commercial AC power source or AC power generator, and includes a high-frequency electric current generation part that converts the AC electric current received from the AC power source into a high-frequency electric current with an inverter or the like. The coil power source 25 is configured to be able to set the frequency, magnitude and duration of the electric current passed through the heating coil 23 as appropriate.

The housing 30 accommodates devices constituting the joined member manufacturing apparatus 1 including the first electrode 11, the second electrode 12, the welding power source 15, the heating coil 23 and the coil power source 25. The joined member manufacturing apparatus 1, which is constituted in this way, can be easily transported as one unit. The housing 30 has an opening 31 through which the first member D and the second member E, and the joined member C can be put into and taken out of the housing 30.

The controller 50 is a device for controlling operation of the joined member manufacturing apparatus 1. The controller 50 is connected to the electrode support 12a (refer to FIG. 1) and the coil support (not shown) via signal cables respectively, and is configured to be able to separately move the second electrode 12 and the heating coil 23 vertically. The controller 50 is also connected to the welding power source 15 via a signal cable, and is configured to be able to control the supply and shutoff of electric current to the first electrode 11 and the second electrode 12, and the magnitude of the electric current supplied to the first electrode 11 and the second electrode 12. The controller 50 is also connected to the coil power source 25 via a signal cable, and is configured to be able to control the supply and shutoff of electric current to the heating coil 23 and the frequency, magnitude and duration of the electric current passed through the heating coil 23. The controller 50 is typically attached to the housing 30 either inside or outside the housing 30 but may be installed at a location remote from the housing 30 and configured to operate the joined member manufacturing apparatus 1 remotely.

Referring to FIG. 3, a method for manufacturing a joined member according to an embodiment of the present invention is now described. FIG. 3 is a schematic view, illustrating a procedure to manufacture the joined member C. It is premised that the method for manufacturing the joined member C described below is carried out by the joined member manufacturing apparatus 1 described previously. In other words, the following description also serves as a description of the working of the joined member manufacturing apparatus 1. The joined member C can be manufactured by a method other than operating the joined member manufacturing apparatus 1. In the following description of a method for manufacturing a joined member, when mention is made of detailed configuration of the joined member manufacturing apparatus 1 and the joined member C, reference is made to FIG. 1 and FIG. 2 as appropriate.

When the first member D and/or the second member E are not in the housing 30, the second electrode 12 and the heating coil 23 are standing by at an upper part in the housing 30. To start manufacturing the joined member C, the first member D and the second member E are first put into the housing 30 through the opening 31. At this time, the first member D is first mounted on the first contact face 11t of the first electrode 11 with the first joint surface Df facing upward, and then, the second member E is mounted on the first member D with the second joint surface Ef in contact with the first joint surface Df (contact-placing step: refer to FIG. 3A). In this way, the first member D and the second member E are placed in the joined member manufacturing apparatus 1 (members placing step). After the first member D and the second member E are mounted on the first contact face 11t, the controller 50 moves the heating coil 23 downward via the coil support (not shown) to place the heating coil 23 in the vicinity of where the end face Ds of the first member D meets the lateral face of the second member E with the second member E extending through the inside of the heating coil 23. At this time, the heating coil 23 is placed so as not to contact the first member D and the second member E.

Figure 3A:
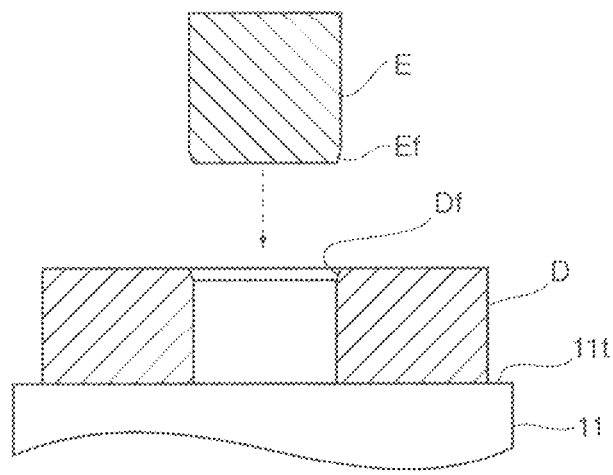
FIGS. 3A, 3B, 3C, 3D and 3E are a schematic view, illustrating the procedure of a method for manufacturing a joined member according to an embodiment of the present invention.
Figure 3B:
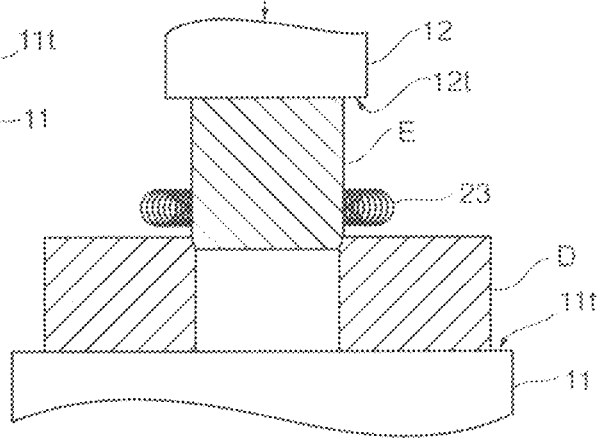

Then, the controller 50 moves the second electrode 12 downward via the electrode support 12a (refer to FIG. 1) to bring the second contact face 12t of the second electrode 12 into contact with the second member E, and further presses the second member E downward against the first member D (refer to FIG. 3B). Then, the controller 50 activates the welding power source 15 to pass an electric current I between the first electrode 11 and the second electrode 12 (electrode energizing step) with simultaneous application of pressure to the contacted portions of the first joint surface Df and the second joint surface Ef. As a result, the contacted portions of the first joint surface Df and the second joint surface Ef are welded to each other (welding step: refer to FIG. 3C). The welding carried out here is resistance welding that uses Joule heat generated by the contact resistance between the first member D and the second member E, which are both made of a metal material, to join them. In this embodiment, because a capacitor that instantaneously discharges electrical energy is included in the welding power source 15, a relatively large electric current is obtained within a short period of time (within several dozen milliseconds, for example) and the first joint surface Df and the second joint surface Ef undergo solid phase joining (in the following, the portion where welding between the first joint surface Df and the second joint surface Ef has been completed is referred to as "welding-completed portion F"). At this time, the first joint surface Df side of the welding-completed portion F is quenched by heat from the welding. The quenched portion has an increased hardness (a Vickers hardness of about 800, for example), but is vulnerable to impacts and may suffer from cracks.

Previously, in order to eliminate the possibility that quenching causes occurrence of cracks, a carburized layer having a possibility of undergoing quenching is removed only from the portion to be joined and its vicinity. However, the carburized layer is so hard that its removal takes significant effort. As an alternative for preventing a joined portion from being quenched, an anti-carburization treatment, which prevents formation of a carburized layer during carburization, can be employed. However, such an anti-carburization treatment also takes a lot of man-hours. When the fact is taken into consideration that it takes significant effort to prevent formation of a carburized layer on a portion to be joined as described above, one possible way to inhibit occurrence of cracks caused by quenching is to carry out joining by welding without preventing a carburized layer from being formed on the portion to be joined, and then to pass an electric current again through the joined portion to temper it after joining by welding is achieved. In some cases, however, the Vickers hardness of the joined portion may not be decreased to a level required for the joined member C as a product even when an electric current is passed through the joined portion again to temper it. The present inventors found that the hardness of a joined portion can be decreased to a level required for the joined member C as a product by the following treatment even when welding is carried out with a carburized layer formed on a portion to be joined and the joined portion is quenched. In the following, the steps following the welding in the method for manufacturing a joined member according to this embodiment are described.

The controller 50 maintains the application of pressure to the welding-completed portion F even after completion of the welding between the first joint surface Df and the second joint surface Ef. This prevents the stress on the welding-completed portion F from being released to cause occurrence of cracks in the quenched portion. In other words, maintaining the application of pressure to the welding-completed portion F even after the completion of welding corresponds to a crack-inhibition step. The controller 50 activates the coil power source 25 to pass an electric current through the heating coil 23 (coil energizing step) while performing the crack-inhibition step. Then, an eddy current Q is generated in the welding-completed portion F, and the welding-completed portion F undergoes high-frequency induction heating (electromagnetic heating step: refer to FIG. 3D). The welding-completed portion F is tempered by the high-frequency induction heating. The controller 50 adjusts the frequency, magnitude and duration of the electric current that is supplied from the coil power source 25 to the heating coil 23 to temper the welding-completed portion F by applying an amount of heat necessary to decrease the hardness of the welding-completed portion F to a level required for the joined member C as a product. At this time, when a depth of the welding-completed portion F (the distance from the heating coil 23 to the farthermost portion of the welding-completed portion F) is large, appropriate tempering may not be achieved. In this embodiment, high-frequency induction heating of the welding-completed portion F is performed according to the following procedure.

Figure 4A:
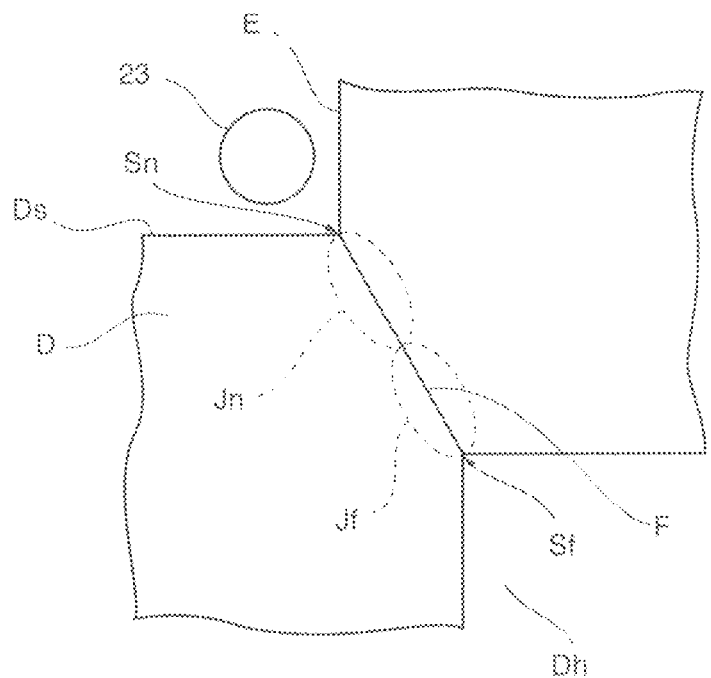
FIG. 4A is a partial cross-sectional view, illustrating a progress of tempering by high-frequency induction heating.
Figure 4B:
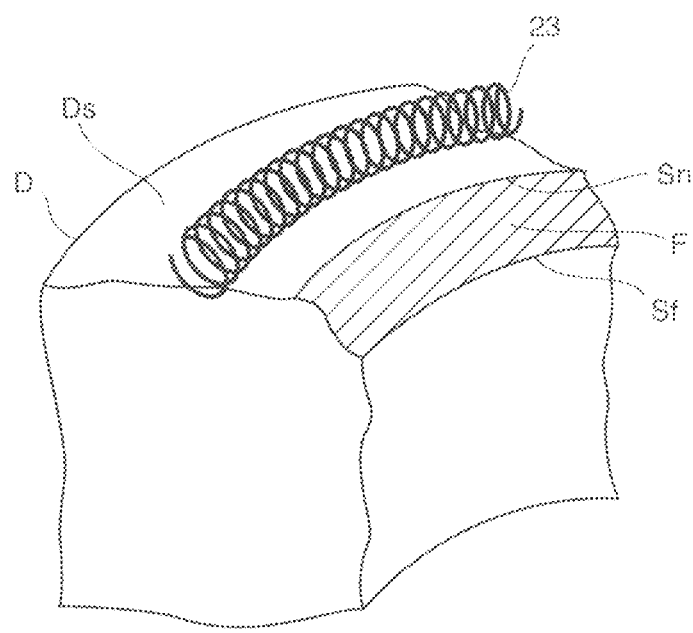
FIG. 4B is a partial cross-sectional perspective view, illustrating a welding-completed portion.

FIG. 4A is a partial cross-sectional view, illustrating a progress of tempering by high-frequency induction heating, and FIG. 4B is a partial cross-sectional perspective view of the welding-completed portion F. The heating coil 23 is placed in the vicinity of a first edge Sn forming a boundary between the end face Ds of the first member D and the lateral face of the second member E. An opposite edge Sf forming a boundary between a face of the hollow portion Dh of the first member D and an end face of the second member E is located remotest from the heating coil 23 in the welding-completed portion F. When the heating coil 23 is used to perform high-frequency induction heating, the controller 50 first increases the output from the coil power source 25 to a relatively high level to heat a region including the welding-completed portion F on the opposite edge Sf side and its vicinity (which is hereinafter referred to as "opposite edge-side region Jf") to a temperature suitable for its tempering until the opposite edge-side region Jf is tempered. At this time, a region including the welding-completed portion F on the first edge Sn side and its vicinity (which is hereinafter referred to as "first edge-side region Jn") has a temperature higher than that of the opposite edge-side region Jf, and may be typically quenched rather than tempered. After the tempering of the opposite edge-side region Jf is completed, the controller 50 once shuts off the output from the coil power source 25 to bring the first edge-side region Jn into a quenched state. Then, the controller 50 increases the output from the coil power source 25 so that the first edge-side region Jn can have a temperature suitable for its tempering, and heats the first edge-side region Jn to the temperature suitable for its tempering until the first edge-side region Jn is tempered. Usually, the output from the coil power source 25 is lower when the first edge-side region Jn is tempered than when the opposite edge-side region Jf is tempered. As described above, in this embodiment, the entire welding-completed portion F can be tempered with one heating coil 23 placed in the vicinity of the first edge Sn. Because high-frequency induction heating is direct heating by an induced electric current, tempering is completed within a shorter period of time compared to ordinary tempering. In addition, because high-frequency induction heating allows local heating, only the vicinity of the welding-completed portion F can be heated to be tempered without causing any adverse effect on the surrounding carburized layer. In other words, for example, tempering in a furnace or the like takes a longer time and may cause even portions that need hardness (such as teeth of a gear) to be also tempered. However, high-frequency induction heating can avoid such adverse effects.

Referring again mainly to FIG. 3, description of the method for manufacturing a joined member is continued. When tempering of the welding-completed portion F by high-frequency induction heating is completed, the controller 50 moves the second electrode 12 upward via the electrode support 12a (refer to FIG. 1) to release the pressure on the welding-completed portion F. Because the welding-completed portion F, which had been quenched by the welding, has been subsequently tempered by high-frequency induction heating, the welding-completed portion F can avoid occurrence of cracks even when the pressure is released. Then, the controller 50 moves the heating coil 23 upward via the coil support (not shown) (refer to FIG. 3E). After that, the manufactured joined member C is taken out of the housing 30 through the opening 31.

As described above, according to the joined member manufacturing apparatus 1 and the method for manufacturing a joined member according to this embodiment, when the portion where the first joint surface Df meets the second joint surface Ef is quenched by welding, the quenched portion is tempered by high-frequency induction heating. Thus, the hardness of the welding-completed portion F can be decreased to a level required for the joined member C as a product and occurrence of cracks in the welding-completed portion F can be inhibited.

Figure 5:
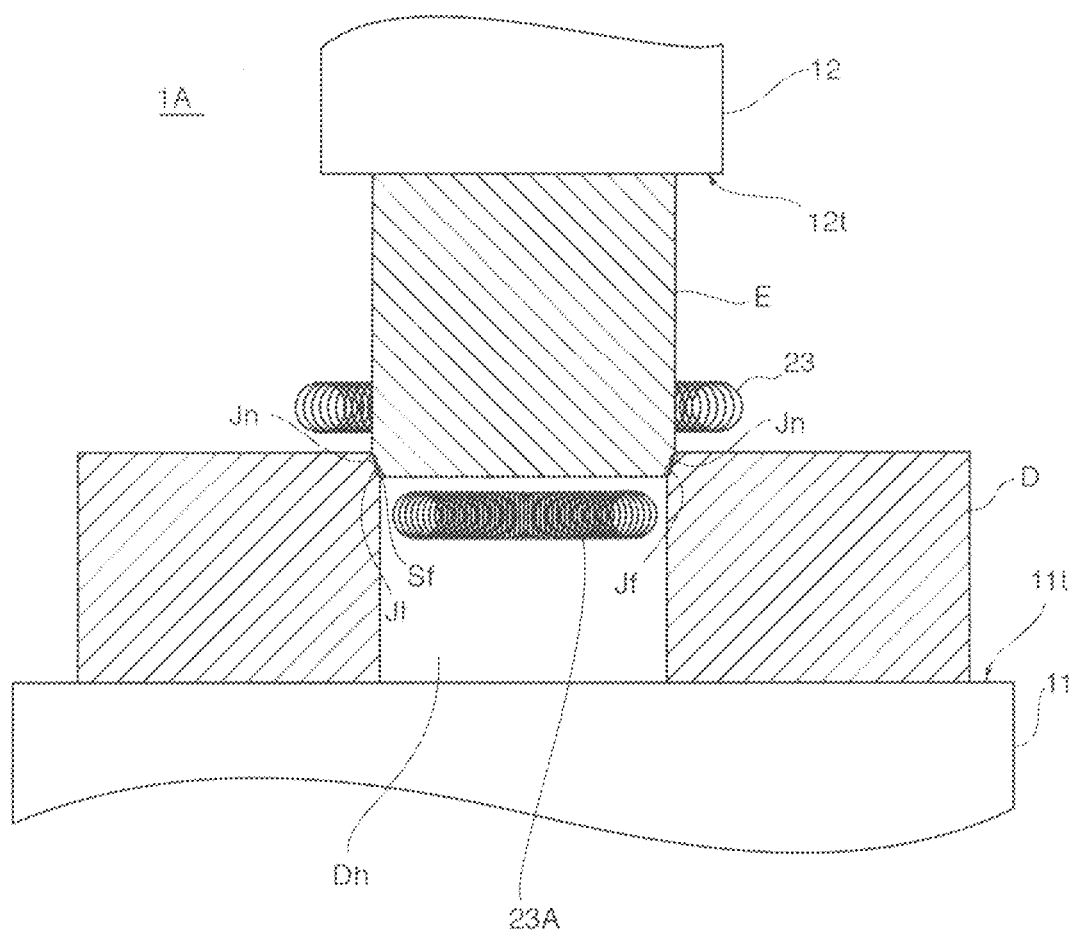
FIG. 5 is a cross-sectional view, illustrating heating coils and their vicinity in a joined member manufacturing apparatus according to a modification of the embodiment of the present invention.

Referring next to FIG. 5, an apparatus 1A for manufacturing joined member according to a modification of the embodiment of the present invention is described. FIG. 5 is a cross-sectional view of heating coils and their vicinity in the apparatus 1A for manufacturing joined member. The apparatus 1A for manufacturing joined member includes a heating coil 23A in addition to the configuration of the joined member manufacturing apparatus 1 described above (refer to FIG. 1). In other words, the apparatus 1A for manufacturing joined member includes two induction heating coils. The heating coil 23A is placed in such a position that it is located in the vicinity of the opposite edge Sf during the tempering by high-frequency induction heating in the above-mentioned method for manufacturing a joined member. In other words, the heating coil 23A is placed below an end face of the second member E and in the hollow portion Dh of the first member D when the first member D is mounted on the first electrode 11 with the second joint surface Ef of the second member E in contact with the first joint surface Df of the first member D. The heating coil 23A is connected to the coil power source 25 (refer to FIG. 1) via a signal cable. The controller 50 (refer to FIG. 1) is configured to be able to control the supply and shutoff of electric current to the heating coil 23A and the frequency, magnitude and duration of the electric current passed through the heating coil 23A separately from those for the heating coil 23. Except for the above, the apparatus 1A for manufacturing joined member has the same configuration as the joined member manufacturing apparatus 1 (refer to FIG. 1).

In a method for manufacturing a joined member according to a modification of the embodiment of the present invention, which is typically carried out using the joined member manufacturing apparatus 1A, when the high-frequency induction heating as in the above-mentioned method for manufacturing a joined member(refer to FIG. 3) is performed (refer to FIG. 3D), the two heating coils 23 and 23A are used simultaneously, instead of the one heating coil 23, to perform the high-frequency induction heating. At this time, the heating coil 23 primarily heats the first edge-side region Jn and the heating coil 23A primarily heats the opposite edge-side region Jf. In other words, the controller 50 controls the frequency and/or magnitude and/or duration of the electric current passed through the heating coil 23 so that the first edge-side region Jn can be heated to a temperature suitable for its tempering and controls the frequency and/or magnitude and/or duration of the electric current passed through the heating coil 23A so that the opposite edge-side region Jf can be heated to a temperature suitable for its tempering. In this way, in this modification, the time required for tempering by high-frequency induction heating (electromagnetic heating step) can be reduced by tempering the first edge-side region Jn and the opposite edge-side region Jf simultaneously. The steps other than the above-mentioned tempering by high-frequency induction heating in the method for manufacturing a joined member according to this modification are the same as those of the manufacturing method shown in FIG. 3. The method for manufacturing a joined member according to this modification can be also achieved by a method other than operating the apparatus 1A for manufacturing joined member.

In the above description, while the first electrode 11 and the second electrode 12 and the welding power source 15 (which may be hereinafter referred to as "electrodes, etc.") used to weld the first member D and the second member E (which may be hereinafter referred to as "works") together, and the heating coil 23 (and the heating coil 23A) and the coil power source 25 (which may be hereinafter referred to as "heating coil, etc.") used for high-frequency induction heating of the works are accommodated in one housing 30, these may not be accommodated in one housing 30 and welding and high-frequency induction heating of the works may be performed at different locations. In this case, before the pressure on the welding-completed portion F is released in order to transport the works from where the electrodes, etc. are located to where the heating coil, etc. are located, the welding power source 15 has to be activated to pass an electric current again through the welding-completed portion F in order to achieve preliminary tempering. The preliminary tempering helps to prevent occurrence of cracks in the quenched welding-completed portion F even when the pressure on the welding-completed portion F is released. In other words, passing an electric current again through the welding-completed portion F in order to achieve preliminary tempering corresponds to a crack-inhibition step. When welding and high-frequency induction heating of the works can be performed at different locations, the degree of freedom of the steps in the method for manufacturing a joined member can be increased.

In the above description, while the second electrode 12 is placed above the first electrode 11, the positions of the first electrode 11 and the second electrode 12 may be reversed vertically so that the first electrode 11 may be placed above the second electrode 12. When the first electrode 11 is placed above the second electrode 12, the first contact face 11$t$ faces downward and the second contact face 12$t$ faces upward. Thus, when the joined member C is manufactured, the second member E is passed through the heating coil 23 placed above the second contact face 12$t$ before the second member E is mounted on the second contact face 12$t$. The first member D is then mounted on the second member E, and the first electrode 11 is moved downward to carry out resistance welding. Then, induction heating is performed with the heating coil 23. At this time, the heating coil 23 may be moved to the vicinity of the first edge Sn after the first member D is mounted on the second member E, or may be fixed in advance at such a position that it is located in the vicinity of the first edge Sn when the second member E with the first member D mounted thereon is mounted on the second contact face 12$t$. In addition, the first electrode 11 and the second electrode 12 have not necessarily to be placed so as to be separated vertically, and may be placed so as to be separated horizontally. In this case, the first electrode 11 and/or the second electrode 12 and the heating coil 23 are configured to be movable in a horizontal direction.

In the above description, while the welding power source 15 is configured to be able to discharge the energy charged in the capacitor instantaneously, a power source configuration used in a welding machine other than a capacitor-type welding machine may be employed.

In the above description, while the first member D is formed to have a ring-like shape and the second member is formed to have the shape of a solid circular cylinder, the second member E may not be solid but may be hollow, and the first member D and/or the second member E may have shapes other than those described herein. In addition, while the first member D is described to be made of carburized steel, the first member D may be made of high-carbon steel that has not undergone a carburization treatment but has a possibility of undergoing quenching by welding. While the first member D is described to be quenched by welding, the joined member C may be manufactured using a material that has been quenched before being welded. In addition, while the first member D and the second member E are described to be made of different types of metals, the first member D and the second member E may be made of the same type of metal. In addition, while the second member E is described to be made of cast iron, the second member E may be also formed of a material having a possibility of undergoing quenching.

In the above description, while the first joint surface Df and the second joint surface Ef are welded by resistance welding, welding other than resistance welding, such as laser welding or electron beam welding, may be employed. The first member D still has a possibility of undergoing quenching when welding other than resistance welding, such as laser welding or electron beam welding, is employed.

In the above description, while the electromagnetic heating for use in tempering the welding-completed portion F is high-frequency induction heating, induction heating using an electromagnetic wave other than a high-frequency wave may be employed.

While an embodiment of the present invention is described in the foregoing, this embodiment is presented as an example and is not intended to limit the scope of the invention. This novel embodiment can be implemented in various other modes, and various omissions, replacements or alterations can be made without departing from the spirit and scope of the invention. The embodiment and modifications thereof are included in the scope and gist of the invention and are also included within the scope of the invention described in the claims and its equivalents.

Figure 3C:
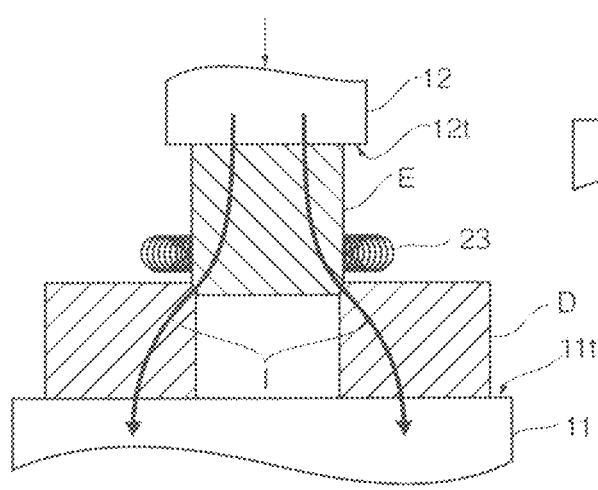
Figure 3D:
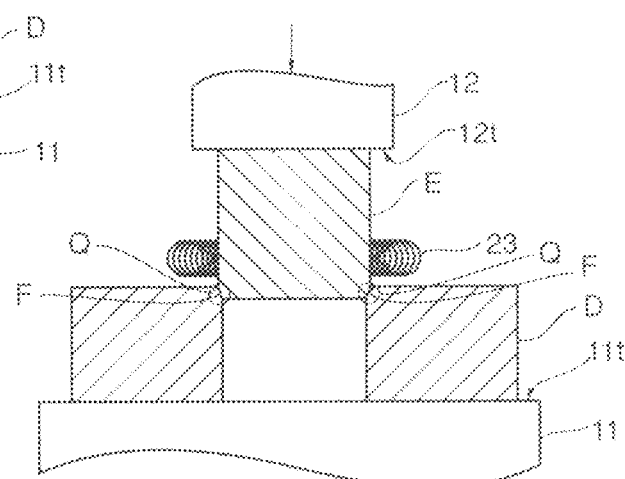
Figure 3E:
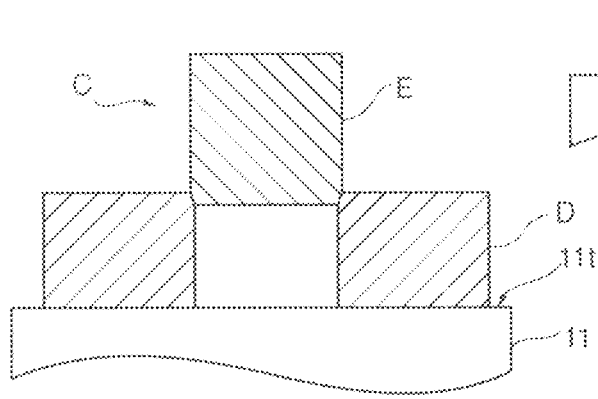

A method for manufacturing a joined member according to the eleventh aspect of the present invention is, as shown in FIGS. 3A, 3C and 3D, for example, a method for manufacturing a joined member C (see FIG. 2C, for example) by joining a first member D formed of a metal material having a possibility of undergoing quenching and a second member E formed of a metal material, and the method includes a contact-placing step of placing the first member D and the second member E with a joint target portion Df of the first member D and a joint target portion Ef of the second member E being in contact with each other (see FIG. 3A); a welding step of welding the joint target portions of the first member D and the second member E by heating (see FIG. 3C); a crack-inhibition step of subjecting the first member D after the welding step to a process for inhibiting occurrence of cracks; and an electromagnetic heating step of tempering a portion where the first member D and the second member E have been welded to each other by electromagnetic heating (see FIG. 3D).

With this configuration, even when the joined portion is quenched by the welding step, the jointed portion can be tempered by electromagnetic heating. Thus, occurrence of cracks in the welded portion can be inhibited.

As for the method for manufacturing a joined member according to the twelfth aspect of the present invention, as shown in FIGS. 3A to 3E, for example, in the method for manufacturing a joined member according to the eleventh aspect, the welding step is a step of performing resistance welding of the joint target portions of the first member D and the second member E with simultaneous application of pressure; and the crack-inhibition step includes maintaining the application of pressure in the welding step.

With this configuration, because the welding and electromagnetic heating can be performed sequentially, productivity can be improved.

As for the method for manufacturing a joined member according to the thirteenth aspect of the present invention, in the method for manufacturing a joined member according to the eleventh aspect, the welding step is a step of performing resistance welding of the joint target portions of the first member and the second member with simultaneous application of pressure; and the crack-inhibition step includes heating the portion where the first member and the second member have been welded to each other, by passing an electric current therethrough in order to achieve preliminary tempering.

With this configuration, because the welding and electromagnetic heating can be performed at different locations, the degree of freedom of steps can be increased.

As for the method for manufacturing a joined member according to the fourteenth aspect of the present invention, as shown in FIGS. 3D, 4A and 4B, for example, in the method for manufacturing a joined member according to any one of the eleventh aspect to the thirteenth aspect, electromagnetic heating step (see FIG. 3D) is achieved by induction heating using an induction heating coil 23, and the electromagnetic heating step includes: placing the induction heating coil 23 in a vicinity of a first edge Sn forming an outer circumference of a joint surface between the first member D and the second member E; and tempering the joint surface Jf on a side of an opposite edge Sf opposed to the first edge Sn first and then tempering the joint surface Jn on a side of the first edge Sn with an output from the induction heating coil 23 reduced to a level lower than that used to temper the joint surface Jf on the side of the opposite edge Sf.

With this configuration, the entire joint surface can be tempered with a single installation of an induction heating coil.

As for the method for manufacturing a joined member according to the fifteenth aspect of the present invention, as shown in FIG. 5, for example, in the method for manufacturing a joined member according to any one of the eleventh aspect to the thirteenth aspect, the electromagnetic heating step is achieved by induction heating using induction heating coils 23 and 23A, and the electromagnetic heating step includes: placing one 23 of the induction heating coils in a vicinity of a first edge Sn forming an outer circumference of the joint surface between the first member D and the second member E and the other 23A in a vicinity of an opposite edge Sf opposed to the first edge Sn of the joint surface, and tempering the joint surface Jn on the side of the first edge Sn with the induction heating coil 23 placed in the vicinity of the first edge Sn and tempering the joint surface Jf on the side of the opposite edge Sf with the induction heating coil 23A placed in the vicinity of the opposite edge Sf.

With this configuration, because the first edge side and the opposite edge side of the joint surface can be tempered simultaneously, the time required for the electromagnetic heating step can be shortened.

A joined member manufacturing apparatus according to the sixteenth aspect of the present invention is, as shown in FIG. 1, for example, an apparatus for manufacturing a joined member C (see FIG. 2C, for example) by joining a first member D formed of a metal material having a possibility of undergoing quenching and a second member E formed of a metal material, and the joined member manufacturing apparatus includes a first electrode 11 to be brought into contact with the first member D; a second electrode 12 to be brought into contact with the second member E; and an induction heating coil 23 for performing induction heating of a portion where a joint target portion Df (see FIG. 2B, for example) of the first member D in contact with the first electrode 11 and a joint target portion Ef (see FIG. 2B, for example) of the second member E in contact with the second electrode 12 have been contacted and joined to each other; wherein the induction heating coil 23 is configured to be placed between the first electrode 11 and the second electrode 12 when the induction heating of a portion where the first member D and the second member E have been joined to each other is performed.

With this configuration, even when the joined portion is quenched when the joint target portions are joined using the first electrode and the second electrode, the jointed portion can be tempered by induction heating by the induction heating coil. Thus, occurrence of cracks in the joined portion can be inhibited.

As for a method for manufacturing a joined member according to the seventeenth aspect of the present invention is, as shown in FIGS. 1, 3A, 3C and 3D, for example, a method for manufacturing a joined member C (see FIG. 2C, for example) with the joined member manufacturing apparatus 1 according to the sixteenth aspect, and the method includes a member placing step of placing the first member D and the second member E in the joined member manufacturing apparatus 1 (see FIG. 3A); an electrode energizing step of passing an electric current between the first electrode 11 and the second electrode 12 (see FIG. 3C); and a coil energizing step of passing an electric current through the induction heating coil 23 (see FIG. 3D).

With this configuration, even when the joined portion is quenched when the joint target portions are joined using the first electrode and the second electrode, the jointed portion can be tempered by induction heating by the induction heating coil. Thus, occurrence of cracks in the joined portion can be inhibited.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS 1 joined member manufacturing apparatus
11 first electrode
12 second electrode
23 heating coil
C joined member
D first member
Df first joint surface
E second member
Ef second joint surface
Jf opposite edge-side region
Jn first edge-side region
Sf opposite edge
Sn first edge

The invention claimed is:

1. A method for manufacturing a joined member by joining a first member formed of a metal material having a possibility of undergoing quenching and a second member formed of a metal material, the method comprising:
   a contact-placing step of placing the first member and the second member with a joint target portion of the first member and a joint target portion of the second member being in contact with each other;
   a welding step of welding the joint target portions of the first member and the second member by heating;
   a crack-inhibition step of subjecting the first member after the welding step to a process for inhibiting occurrence of cracks;
   an electromagnetic heating step of tempering a portion where the first member and the second member have been welded to each other by electromagnetic heating;
   wherein the welding step is a step of performing resistance welding of the joint target portions of the first member and the second member with simultaneous application of pressure; and
   wherein the electromagnetic heating step includes tempering a welding-completed portion by applying an amount of heat necessary to decrease a hardness of the welding-completed portion to a level required for the joined member.

2. The method for manufacturing a joined member according to claim 1,
   wherein the electromagnetic heating step is achieved by induction heating using induction heating coils, and the electromagnetic heating step includes: placing one of the induction heating coils in a vicinity of a first edge forming an outer circumference of the joint surface between the first member and the second member and the other in a vicinity of an opposite edge opposed to the first edge of the joint surface, and tempering the joint surface on the side of the first edge with the induction heating coil placed in the vicinity of the first edge and tempering the joint surface on the side of the opposite edge with the induction heating coil placed in the vicinity of the opposite edge.

3. A method for manufacturing a joined member by joining a first member formed of a metal material having a possibility of undergoing quenching and a second member formed of a metal material, the method comprising:
   a contact-placing step of placing the first member and the second member with a joint target portion of the first member and a joint target portion of the second member being in contact with each other;
   a welding step of welding the joint target portions of the first member and the second member by heating;
   a crack-inhibition step of subjecting the first member after the welding step to a process for inhibiting occurrence of cracks;
   an electromagnetic heating step of tempering a portion where the first member and the second member have been welded to each other by electromagnetic heating;
   wherein the welding step is a step of performing resistance welding of the joint target portions of the first member and the second member with simultaneous application of pressure;
   wherein the crack-inhibition step includes heating the portion where the first member and the second member have been welded to each other, by passing an electric current therethrough in order to achieve preliminary tempering; and
   wherein the electromagnetic heating step is achieved by induction heating using an induction heating coil, and the electromagnetic heating step includes: placing the induction heating coil in a vicinity of a first edge forming an outer circumference of a joint surface between the first member and the second member; and tempering the joint surface on a side of an opposite edge opposed to the first edge first and then tempering the joint surface on a side of the first edge with an output from the induction heating coil reduced to a level lower than that used to temper the joint surface on the side of the opposite edge.

4. A method for manufacturing a joined member by joining a first member formed of a metal material having a possibility of undergoing quenching and a second member formed of a metal material, the method comprising:
- a contact-placing step of placing the first member and the second member with a joint target portion of the first member and a joint target portion of the second member being in contact with each other;
- a welding step of welding the joint target portions of the first member and the second member by heating;
- a crack-inhibition step of subjecting the first member after the welding step to a process for inhibiting occurrence of cracks; and
- an electromagnetic heating step of tempering a portion where the first member and the second member have been welded to each other by electromagnetic heating;
- wherein the electromagnetic heating step is achieved by induction heating using an induction heating coil, and the electromagnetic heating step includes: placing the induction heating coil in a vicinity of a first edge forming an outer circumference of a joint surface between the first member and the second member; and tempering the joint surface on a side of an opposite edge opposed to the first edge first and then tempering the joint surface on the side of the first edge with an output from the induction heating coil reduced to a level lower than that used to temper the joint surface on the side of the opposite edge.

5. The method for manufacturing a joined member according to claim 4,
- wherein the welding step is a step of performing resistance welding of the joint target portions of the first member and the second member with simultaneous application of pressure; and
- wherein the crack-inhibition step includes maintaining the application of pressure in the welding step.

* * * * *